(No Model.)
G. W. MORRIS.
FEEDER AND BAND CUTTER.
No. 440,180. Patented Nov. 11, 1890.
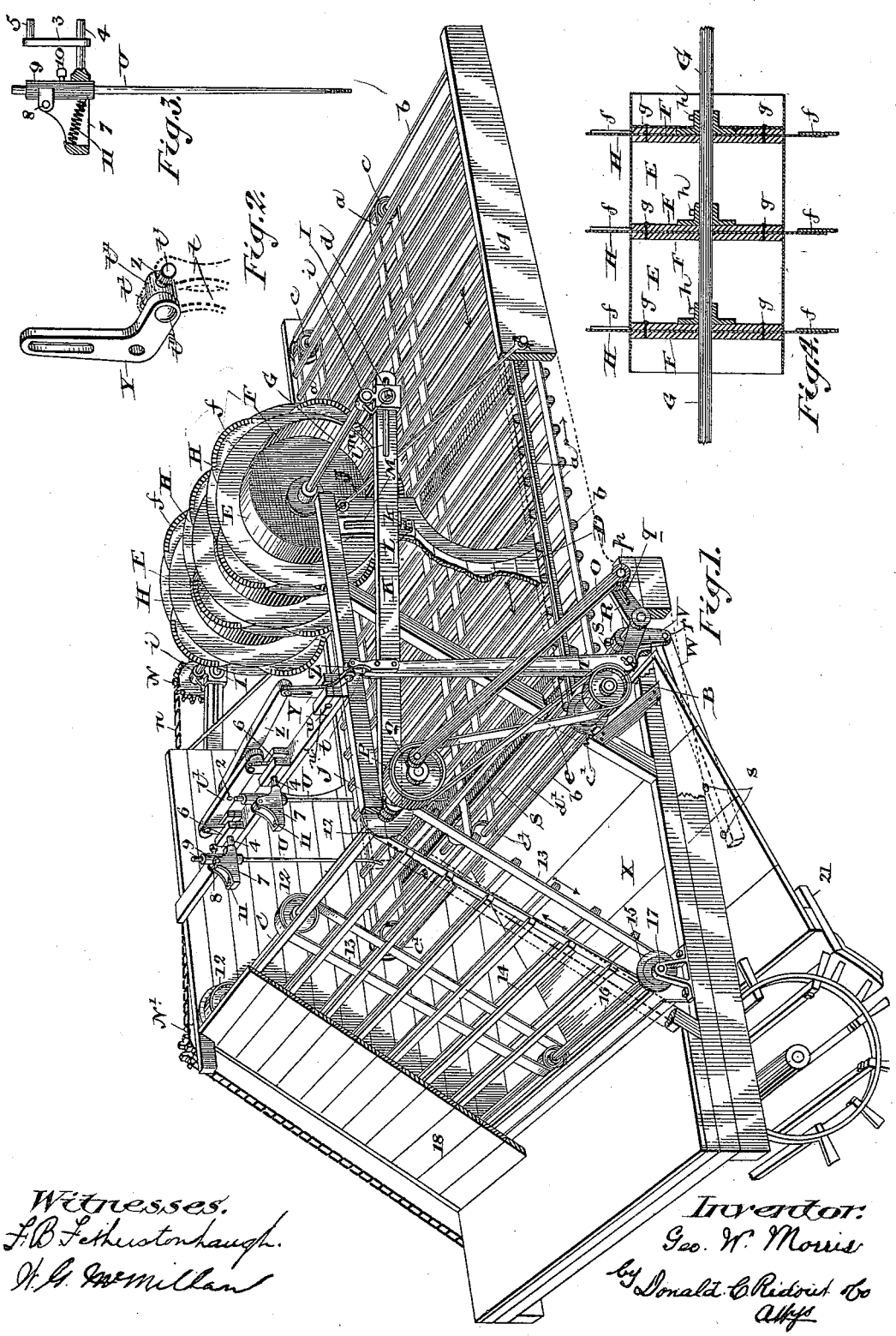
Witnesses.
F. B. Fetherstonhaugh.
H. G. McMillan
Inventor:
Geo. W. Morris
by Donald C. Ridout & Co
Attys

UNITED STATES PATENT OFFICE.

GEORGE W. MORRIS, OF BRANTFORD, CANADA, ASSIGNOR TO ALICE MORRIS, OF SAME PLACE.

FEEDER AND BAND-CUTTER.

SPECIFICATION forming part of Letters Patent No. 440,180, dated November 11, 1890.

Application filed March 6, 1890. Serial No. 342,846. (No model.)

*To all whom it may concern:*

Be it known that I, GEORGE WILLIAM MORRIS, of the city of Brantford, in the county of Brant, in the Province of Ontario, Canada, have invented a certain new Feeder and Band-Cutter, of which the following is a specification.

The object of the invention is to provide in a thrashing-machine a simple and inexpensive automatic device to cut the bands of sheaves and feed them evenly into the cylinder.

The invention consists in the peculiar construction, arrangement, and combination of parts, hereinafter more particularly described, and then definitely pointed out in the claims.

In the accompanying drawings, Figure 1 is a perspective view of my device, partly broken away. Fig. 2 is a detail of knuckle-joint. Fig. 3 is a detail of spreading-tine. Fig. 4 is a sectional detail of the cutter-knife cylinder.

In the drawings, like letters and numerals of reference indicate similar parts in the different figures.

In Fig. 1, A is the frame of the horizontal sheaf-carrying endless carrier, partly broken away so as to expose the traveling bands $a$ and slats $b$ of the carrier, and $c$ $c'$ are the band-pulleys. The pulleys $c$ are fixed to a shaft $d$, journaled in the frame A, and the pulleys $c'$ on a shaft $d'$, also journaled on said frame. The pulleys $c'$ drive the horizontal endless carrier and derive motion from the wheel B, which is actuated by the belt $e$ from the main driving-shaft or upper shaft C of the vertical endless carrier.

J is one of the two hangers pivotally and removably attached to the frame of the carrier and the machine.

D is part of the main frame of the machine, broken away so as to expose the interior.

The metal cylinders E prevent straw winding on the cutter-knife shaft G, and are slipped onto the wooden disks F, (*vide* also Fig. 4,) which are keyed onto the cutter-knife shaft G, and which clamp the metal disks H, which carry the crescent-shaped cutter-knives $f$ in position, the cutting-edges whereof are serrated. The bolts $g$ pass through the wooden disks F, as well as through the metal disks H, and set-screws $h$ pass through the hub and fasten the disks to the cutter-knife shaft G. The cutter-knife shaft G is journaled at $i$ on the sleeve I, and K is a pivoted arm, pivoted at $j$ to the frame-work and which rests on an elbow-stop L, vertically adjustable in the slotted bracket M by means of the bolt and nut $k$, which bracket is attached to the frame. The sleeve I, which carries the bearings $i$ for the cutter-knife shaft, is adjustable lengthwise in the slot $l$, formed in the arm K, by means of bolt, washer, and nut at $m$. By this arrangement the cutting-edges of the crescent-shaped cutter-knives $f$ can rise and fall with the pivoted arm, according to the size of the sheaf passing under the knives.

N is a sprocket-wheel, which actuates the cutter-knife shaft G, and is itself driven by the chain $n$, proceeding from the sprocket-wheel N', which is driven by sprocket-chain from the counter-shaft on the front of the separator.

O is the rocker-pitman, one end being pivotally attached to the crank-arm $o$ on the pulley P on the driving-shaft C, or upper shaft of the vertical endless rake. The lower end of the pitman O is pivotally attached at $p$ to the bell-crank lever R, and is adjustable to or from the rock-shaft S by means of the slot $q$, so as to vary the throw of the shaft T, which actuates the spreading-tines U. The bell-crank lever R, which is secured to the ends of the rock-shaft S, actuates the arms V, which are keyed or secured to the rock-shaft. The lower ends are pivotally attached at $r$ to the braces W, which are bolted at $s$ to the reciprocating feed-board X. This reciprocating feed-board X, being pivoted at $r$ to the arms V and free at its opposite side, where it rests on shelf 21, can be turned up out of the way when it is required to get at either the cylinder or concave of the machine. The lower end of the pitman T is pivotally connected with the bell-crank lever R and at its upper end to the bell-crank lever Y by means of the knuckle-joint Z, (a detail of which is shown in Fig. 2,) in which the jaws $t$, fastened to the upper end of shaft T, fit onto trunnions $t'$ on the hollow joint $t''$. Through this hollow joint $t''$ passes the bolt $t'''$, which connects the bell-crank lever Y to the hollow joint $t''$. The bell-crank lever Y is pivoted at $u$ in the the box $u'$. The upper end of the bell-crank is pivoted to the arm $z$, the other end of which is pivoted to the link $l'$ by the pivot 2.

Details of the spreading-tine U and attachments are shown in Fig. 3, in which 3 is the arm rigidly attached to the spindle 4, the arm 3 being attached by pin or projection 5 to the link $l'$. The spindle 4, which is adapted to move in suitable bearings 6, carries the open bracket 7, one-half of which is removed in the detail. In this open bracket at 8 is pivoted the socket 9 for the spreading-tine U, which is held or clamped in position by the set-screw 10.

11 is a spring bearing against the bracket and socket, so that when an obstruction arises the spreading-tine may give back so as to allow the straw to pass. The lower points of spreading-tines U are curved outwardly, as shown, so as better to spread the straw.

The upper shaft C of the vertical carriers carries the pulleys 12, which drive the belts 13, carrying the slats 14 for the vertical endless carrier, the band-rollers 15 being on a shaft 16, journaled, as at 17, on the frame of the machine. A part of the covering-boards 18 has been removed to show the vertical endless carriers in position.

The machine having been connected to the driving mechanism of the separator and put in motion, the sheaves are thrown on the horizontal endless carrier, which travels in the direction of the arrows and carries the sheaves under the revolving crescent-shaped knives, which are free to rise and mount the larger sheaves. The bands on the sheaves having been cut, the sheaves pass to the spreading-tines U, which by their lateral motion very effectually spread and distribute the sheaf the entire width of the mouth of the machine. The straw is then discharged by the action of the horizontal and vertical endless carriers on the reciprocating feed-board, and which by its reciprocating motion feeds the grain very evenly to the thrashing-cylinder.

In loose grain, more especially peas, the upper vertical endless rake assists very materially in turning or deflecting the straw toward the teeth of the cylinder and effectually prevents all clogging at the mouth of the machine.

When it is desired to put through the machine any loose or shelled grain or straw which may have fallen on the floor, the horizontal sheaf-carrying endless carrier may be removed by detaching from it the hangers J and drawing back the horizontal sheaf-carrier from the guards 18, the belt which drives this horizontal carrier being also removed. The loose grain, chaff, and dust may then be thrown into the machine with a scoop-shovel. The detachability of this horizontal sheaf-carrying endless rake, as well as of the shaft carrying the disks and crescent-shaped cutter-knives, is a great convenience when the machine is to be moved from place to place.

What I claim as my invention is—

1. In a feeder and band-cutter, a horizontal endless sheaf-carrier, a rotary shaft and pulley giving motion to said endless carrier through an intermediate belt and pulley, rotary cutters above said carrier, spreading-tines for opening the sheaves after the bands have been cut, a reciprocating feed-board, a rock-shaft, a bell-crank lever receiving motion from the first-mentioned rotary shaft and giving motion to the rock-shaft and tines, and an arm fast on the rock-shaft, giving motion to the reciprocating feed-board, substantially as described.

2. The combination, in a band-cutter, of the cutter-knife shaft G, cylinder E, the wooden disks F, attached to the cutter-knife shaft, the metal disks H, and the cutter-knives F, substantially as described.

3. The combination, in a band-cutter, and with the knives and carrier thereof, of the oscillating open bracket 7, having spindle 4, the socket 9, pivoted in the bracket, the tine U, and the spring 11, substantially as described.

4. The combination, in a band-cutter, and with the knives and carrier thereof, of the double bearings 6, the oscillating open bracket 7, having spindle 4 mounted in said bearings, the arm 3, connected to the spindle and working between the bearings 6 and connected by intervening mechanism with the driving-power, the socket 9, pivoted in said bracket, the tine U, fast in said socket, and the spring 7, substantially as described.

5. The combination, with the pivoted arm K, of the adjustable sleeves I, journals $i$, the slotted brackets M, and vertically-adjustable elbow-stops L, the cutter-knife shaft G, the cylinders E, the wooden disks F, attached to the cutter-knife shaft G, the metal disks H, and the crescent-shaped cutter-knives $f$, with serrated edges, operated substantially as described and specified.

6. The combination, with the rocker-pitman O, pivotally attached to crank-arm $o$ on pulley P on shaft C, of the rocker R on rock-shaft S, shaft T, pivotally connected to rocker R and to bell-crank V by knuckle-joint, and the arm Z, so connected with the bell-crank V and the spreading-tines U as to give a lateral throw to the said tines, substantially as specified.

7. The combination, with the bell-crank V, actuated as specified, of the arm Z, link $l'$, arm 3, spindle 4 in suitable bearings, the open bracket 7, the spring 11, socket 9, pivoted to the bracket, bolt 10, and spreading-tine U, with outwardly-bent point, substantially as described and specified.

Brantford, January 17, 1890.

GEORGE W. MORRIS.

In presence of—
THOS. H. SEARS,
T. J. MORRIS.